US009143460B2

(12) United States Patent
Dhara et al.

(10) Patent No.: US 9,143,460 B2
(45) Date of Patent: *Sep. 22, 2015

(54) SYSTEM AND METHOD FOR PREDICTING MEETING SUBJECTS, LOGISTICS, AND RESOURCES

(71) Applicant: Avaya Inc., Basking Ridge, NJ (US)

(72) Inventors: Krishna Kishore Dhara, Dayton, NJ (US); Venkatesh Krishnaswamy, Holmdel, NJ (US); Eunsoo Shim, Princeton Junction, NJ (US); Xiaotao Wu, Edison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,079

(22) Filed: Jul. 15, 2013

(65) Prior Publication Data

US 2013/0304924 A1    Nov. 14, 2013

Related U.S. Application Data

(63) Continuation of application No. 13/049,067, filed on Mar. 16, 2011, now Pat. No. 8,489,615.

(60) Provisional application No. 61/315,719, filed on Mar. 19, 2010.

(51) Int. Cl.
*G06F 7/00* (2006.01)
*G06F 17/30* (2006.01)
(Continued)

(52) U.S. Cl.
CPC ............ *H04L 47/70* (2013.01); *H04L 12/1818* (2013.01); *H04L 65/403* (2013.01); *H04M 3/565* (2013.01)

(58) Field of Classification Search
CPC ............ G06Q 10/109; G06Q 10/1093; G06Q 10/06314; Y10S 715/963
USPC ........................................................ 707/748
See application file for complete search history.

(56) References Cited

U.S. PATENT DOCUMENTS 6,101,480 A * 8/2000 Conmy et al. ............... 705/7.18
6,141,339 A   10/2000 Kaplan et al.
(Continued)

FOREIGN PATENT DOCUMENTS

| CN | 1484800 | 3/2004 |
| CN | 1499841 | 5/2004 |
| CN | 101198976 | 6/2008 |

OTHER PUBLICATIONS

Melchiorre et al., "inContext-Interaction and Context-based Technologies for Collaborative Teams", *Softeco Sismat S.p.A., Via De Marini I*, Genova, 16145, Italy, 2008,
(Continued)

*Primary Examiner* — Binh V Ho

(57) ABSTRACT

Disclosed herein are systems, methods, and non-transitory computer-readable storage media for predicting the subject, logistics, and resources of associated with a communication event. Predictions and suggestions can occur prior to, during, or in response to communication events. The user can confirm the prediction or suggestion via user input such as a click or a voice command. The system can analyze past behavior patterns with respect to the subject, logistics and resources of communication events, followed by preparing ranked listings of which subjects, logistics, and resources are most likely to be used in a given situation. The predicted logistics may then include people to invite, time and date of the meeting, its duration, location, and anything else useful in helping potential participants gather together. The resources may include files attached, files used, communication event minutes, recordings made, Internet browsers and other programs which may be utilized by the user.

14 Claims, 16 Drawing Sheets

(51) Int. Cl.
*H04L 12/911* (2013.01)
*H04L 12/18* (2006.01)
*H04M 3/56* (2006.01)
*H04L 29/06* (2006.01)

(56) References Cited

U.S. PATENT DOCUMENTS

| | | | |
|---|---|---|---|
| 6,603,489 B1* | 8/2003 | Edlund et al. | 715/780 |
| 6,633,868 B1 | 10/2003 | Min et al. | |
| 6,813,603 B1* | 11/2004 | Groner et al. | 704/235 |
| 7,007,235 B1* | 2/2006 | Hussein et al. | 715/751 |
| 7,010,115 B2 | 3/2006 | Dezonno et al. | |
| 7,483,946 B2* | 1/2009 | Boyd | 709/204 |
| 7,499,535 B1 | 3/2009 | Ivory et al. | |
| 2002/0091769 A1 | 7/2002 | Drozdzewicz et al. | |
| 2002/0136382 A1 | 9/2002 | Cohen et al. | |
| 2004/0064585 A1* | 4/2004 | Doss et al. | 709/246 |
| 2005/0119927 A1* | 6/2005 | Patel | 705/8 |
| 2005/0120108 A1* | 6/2005 | Wisniewski et al. | 709/224 |
| 2005/0278307 A1* | 12/2005 | Battagin et al. | 707/3 |
| 2006/0143298 A1* | 6/2006 | Anttila et al. | 709/227 |
| 2006/0293943 A1* | 12/2006 | Tischhauser et al. | 705/9 |
| 2007/0005409 A1 | 1/2007 | Boss et al. | |
| 2007/0016661 A1* | 1/2007 | Malik | 709/223 |
| 2007/0021997 A1* | 1/2007 | Hayes et al. | 705/9 |
| 2007/0033251 A1 | 2/2007 | Mandalia et al. | |
| 2007/0071209 A1* | 3/2007 | Horvitz et al. | 379/201.06 |
| 2007/0112881 A1* | 5/2007 | Lyle et al. | 707/201 |
| 2007/0174104 A1* | 7/2007 | O'Sullivan et al. | 705/9 |
| 2008/0114840 A1* | 5/2008 | Rollin et al. | 709/206 |
| 2008/0120293 A1* | 5/2008 | Morisawa | 707/5 |
| 2008/0133282 A1* | 6/2008 | Landar et al. | 705/5 |
| 2008/0294482 A1* | 11/2008 | Bank et al. | 705/8 |
| 2008/0294999 A1* | 11/2008 | Bank et al. | 715/751 |
| 2008/0300944 A1* | 12/2008 | Surazski et al. | 705/8 |
| 2009/0089133 A1* | 4/2009 | Johnson et al. | 705/9 |
| 2009/0125818 A1* | 5/2009 | Ritter et al. | 715/753 |
| 2009/0172513 A1* | 7/2009 | Anderson et al. | 715/210 |
| 2009/0192861 A1* | 7/2009 | Suzuki et al. | 705/8 |
| 2009/0210351 A1* | 8/2009 | Bush et al. | 705/80 |
| 2009/0222519 A1* | 9/2009 | Boyd | 709/204 |
| 2009/0222741 A1* | 9/2009 | Shaw et al. | 715/753 |
| 2009/0259718 A1* | 10/2009 | O'Sullivan et al. | 709/204 |
| 2009/0265203 A1* | 10/2009 | Marcus et al. | 705/8 |
| 2009/0307045 A1* | 12/2009 | Chakra et al. | 705/9 |
| 2009/0313075 A1* | 12/2009 | O'Sullivan et al. | 705/9 |
| 2010/0088144 A1* | 4/2010 | Collet et al. | 705/9 |
| 2010/0184768 A1* | 7/2010 | Stock et al. | 514/237.5 |
| 2010/0223638 A1* | 9/2010 | Hubbard | 725/9 |
| 2010/0235446 A1* | 9/2010 | Hehmeyer et al. | 709/205 |
| 2010/0318399 A1* | 12/2010 | Li et al. | 705/9 |
| 2011/0022967 A1 | 1/2011 | Vijayakumar et al. | |
| 2011/0022976 A1 | 1/2011 | Huang et al. | |
| 2011/0060808 A1* | 3/2011 | Martin et al. | 709/217 |
| 2011/0072362 A1* | 3/2011 | Denner et al. | 715/751 |
| 2011/0137929 A1* | 6/2011 | Lehmann et al. | 707/769 |
| 2011/0154221 A1* | 6/2011 | DeLuca et al. | 715/752 |
| 2011/0184768 A1* | 7/2011 | Norton et al. | 705/5 |
| 2011/0252097 A1* | 10/2011 | Walker et al. | 709/206 |

OTHER PUBLICATIONS

Riedel, Alexander, "Collaborative Scheduling Using Context-Awareness", KTH Information and Communication Technology, Master of Science Thesis, Stockholm, Sweden 2010. TRITA-ICT-EX-2010:35, Mar. 25, 2010.

Singh et al., "Distributed AI, Schedules, and the Semantic Web", Automated Scheduling, www.xml-journal.com, pp. 40-45, Nov. 2002.

Chen et al., "Intelligent Agents Meet Semantic Web in a Smart Meeting Room", AAMAS '04 Proceedings of the Third International Joint Conference on Autonomous Agents and Multiagent Systems, vol. 2, IEEE Computer Society Washington, DC, USA, 2004.

Dourish et al., "Information and Context: Lessons from the Study of Two Shared Information Systems", In *COCS '93: Proceedings of the conference on Organizational computing systems*, 1993, pp. 42-51.

* cited by examiner

FIG. 7

COMMUNICATION EVENT INVITATION

- TO: ☐ — 702
  - SUGGESTIONS: ○ BOB
  - ○ CATHY } 704

- SUBJECT: ☐ — 702
  - SUGGESTIONS: ○ SALES REPORT
  - ○ GOLF } 704

- LOCATION: ☐ — 702
  - SUGGESTIONS: ○ RED CONFERENCE ROOM
  - ○ http:// onlineconference/78710 .com
  - ○ CONFERENCE BRIDGE ACCESS NUMBER XX PASSCODE YY } 704

- TIME: ☐ — 702
  - SUGGESTIONS: ○ WEDNESDAY 3 PM
  - ○ FRIDAY 11 AM } 704

- DURATION: ☐ — 702
  - SUGGESTIONS: ○ 1 HOUR
  - ○ 2 HOUR
  - ○ 30 MIN } 704

- ATTACHMENTS: ☐ — 702
  - SUGGESTIONS: ○ DOC1.doc
  - ○ DOC2.doc
  - ○ REPORTS.xls } 704

COMMUNICATION EVENT INVITATION

TO: [ANDY] — 802
SUGGESTIONS: ○ CATHY } 804
○ DOUG

SUBJECT: [_____] — 806
SUGGESTIONS: ○ WEEKLY MEETING
○ SALES REPORT } 804
○ GOLF

LOCATION: [_____] — 810
SUGGESTIONS: ○ http://onlineconference/78710 .com
○ RED CONFERENCE ROOM } 812
○ CONFERENCE BRIDGE ACCESS NUMBER XX PASSCODE YY

TIME: [_____] — 810
SUGGESTIONS: ○ WEDNESDAY 3 PM } 808
○ FRIDAY 11 AM

DURATION: [_____] — 810
SUGGESTIONS: ○ 30 MIN
○ 1 HOUR } 812
○ 2 HOUR

ATTACHMENTS: [_____] — 810
SUGGESTIONS: ○ DOC1.doc
○ DOC2.doc } 808
○ REPORTS.xls

800

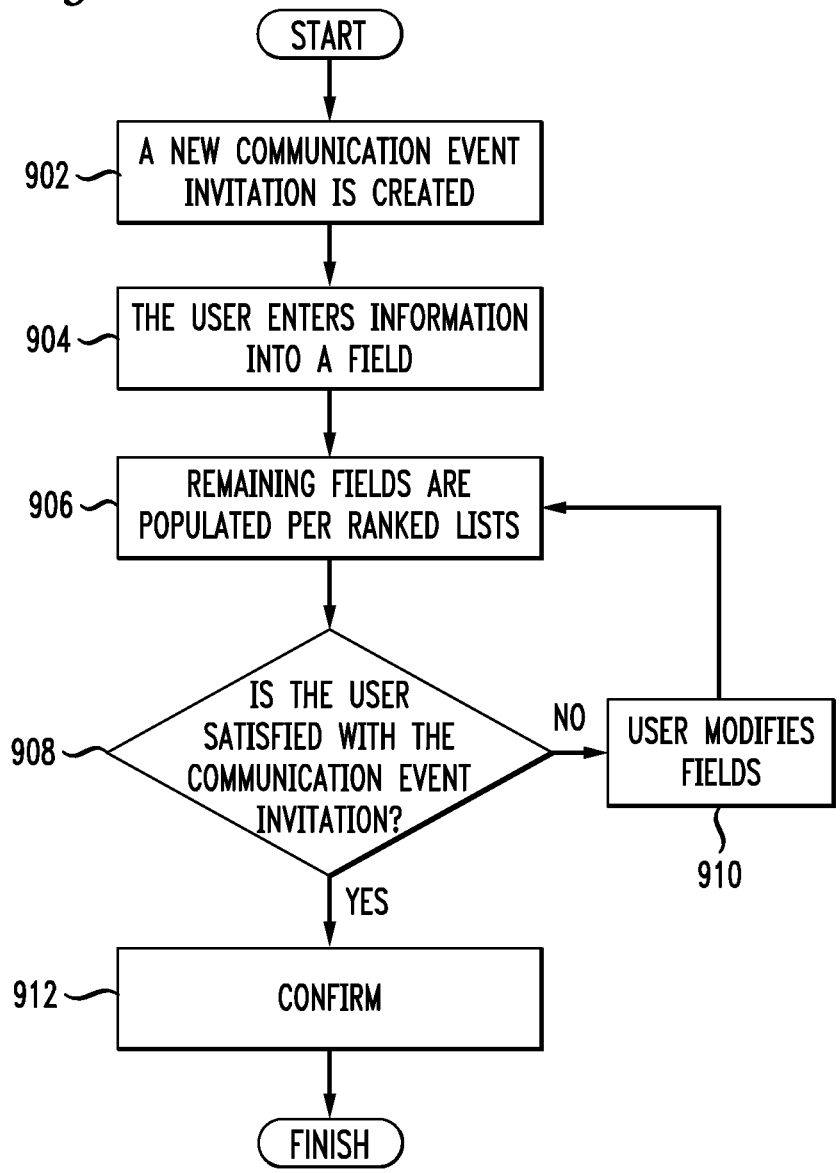

SYSTEM AND METHOD FOR PREDICTING MEETING SUBJECTS, LOGISTICS, AND RESOURCES

RELATED APPLICATIONS

This application is a continuation of U.S. patent application Ser. No. 13/049,067, filed Mar. 16, 2011, which claims priority to U.S. Provisional Application 61/315,719, filed 19 Mar. 2010, the contents of which are herein incorporated by reference in their entirety.

BACKGROUND

1. Technical Field

The present disclosure relates to communications and more specifically to predicting the subject, logistics, and resources of associated with a communication event.

2. Introduction

Modern technology has given those who wish to schedule a gathering of multiple people many options. They can consider what type of event to schedule, such as classic in-person meetings, a conference call, a video conference, or any other type of communication event. They can consider whom to invite, the location, the time, and the duration of the communication event. Further considerations are what attachments to send with the invitation, the subject matter, how this communication event compares and contrasts with previous events, as well as how this will coincide with everyone's schedule. Given the many factors involved in making a new invitation it can be useful to examine previous communication event invitations to remember details. However, given time, the number of previous meetings and details of those events simply become too cumbersome to search through.

Similarly, during a communication event participants can take notes, look at sent attachments, record audio, send instant message communications with other participants, or examine other resources. The ability to access information during the communication event can boost productivity and topic comprehension, but if there is trouble in locating resources during the communication event it can also be burdensome. With the continual increase of applications and documents available for use during a communication event, the burden of finding the right information at the right time also increases until the burden outweighs the benefits. There exists, then, a need to quickly and efficiently find useful, relevant information for inviting people to and participating in communication events.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for predicting and/or suggesting subjects, logistics, and resources associated with a communication event. Such prediction and suggestion can occur prior to, during, or in response to communication events. The user can confirm the prediction or suggestion via user input such as a click or a voice command. The system can analyze past behavior patterns with respect to the subject, logistics and resources of communication events, followed by preparing ranked listings of which subjects, logistics, and resources are most likely to be used in a given situation. For instance, the analyzed logistics may include previous invitees, previous participants, the date and time of previous communication events, their duration, location, action items, and post-communication event behavior. The predicted logistics may then include people to invite, time and date of the meeting, its duration, location, and anything else useful in helping potential participants gather together. Similarly, the analyzed and predicted resources may include files attached, files used, communication event minutes, recordings made, Internet browsers, and other programs which may be utilized by the user in the communication event.

In one embodiment, the user creates a new communication event invitation, enters data into a field, and the system automatically populates at least one remaining subject, logistics, or resource field. The user can then modify or correct any of the populated fields, at which time system re-evaluates the presented scenario and/or context, and re-populates the subject and logistics fields based on the additional information. This iterative process of modification, re-evaluation and re-population of the subject and logistics fields continues until the user is satisfied with the communication event invitation and so confirms. The system can then, during the communication event, suggest actions and resources to the user based on the previous rankings of subjects and logistics, as well as on-going analysis of resource use. Following the communication event, the system may direct that additional actions be taken based on previous behavior patterns, such as creating a follow-up communication event, calling a colleague, or reviewing minutes.

In one aspect, the system monitors repeated behavior and communications to determine what the user is likely to want or do in a similar situation. In another aspect, the system extracts similar or useful resources and suggests them to the user. In yet another aspect, the system communicates with and monitors other communication event systems and coordinates the user interaction with those systems.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates a blank exemplary communication event invitation with suggested fields;

FIG. 8 illustrates an exemplary communication event invitation with suggested fields;

FIG. 9 illustrates a first example method embodiment;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for predicting subjects and logistics for communication events. A system, method and non-transitory computer-readable media are disclosed which analyze user behavior, previous communication events, and logistics of involved parties to suggest resources, subjects, and logistics involved in communication events. A brief introductory description of a basic general purpose system or computing device in FIG. 1 which can be employed to practice the concepts is disclosed herein. A more detailed description of the various graphical interfaces, system infrastructure, and methods will then follow. Multiple variations shall be discussed herein as the various embodiments are set forth. The disclosure now turns to FIG. 1.

Figure 1:
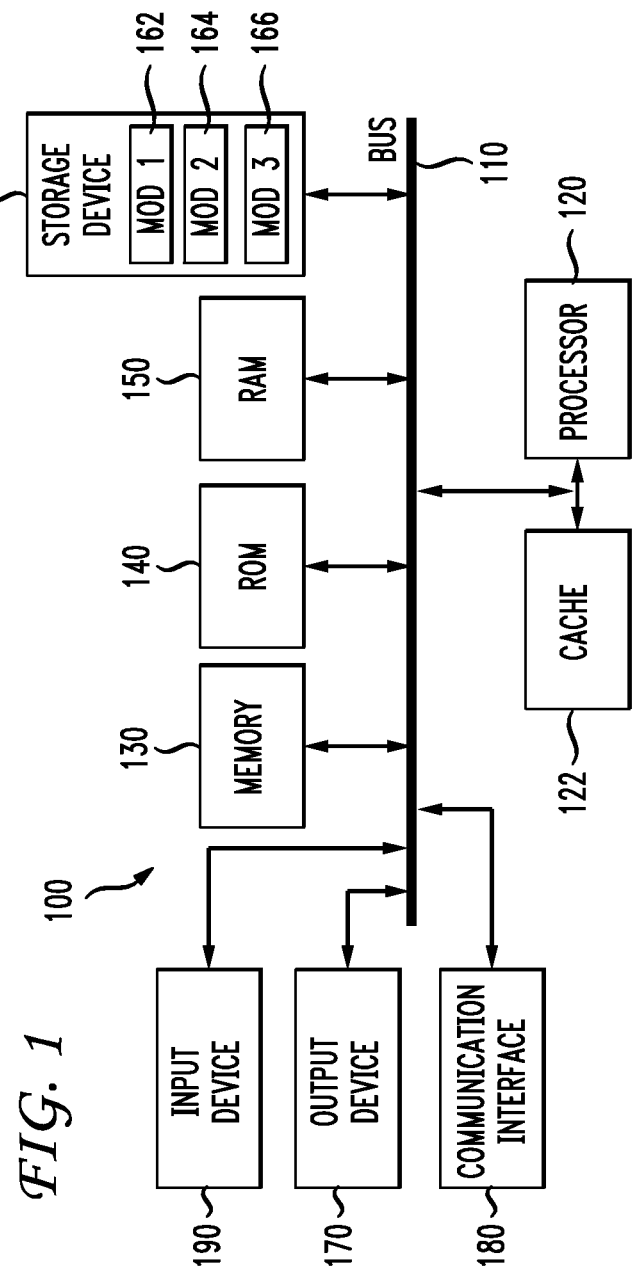
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some basic computing system components, the disclosure returns to a discussion of predictive communication event subjects and logistics. The approaches discussed herein apply equally to pre-communication events, in-communication event suggestions, and post-communication event planning. Each of these phases can incorporate an analysis of a user's communication history, document usage history, and meeting schedule. A communication history can include previous communication events, metadata, and other communication data. For example, communication events may be meetings, conferences, conference calls, video conferences, or other type of in-person or virtual meeting where a coordinated effort is made to establish contact between two or more people. Examples of other communication data include phone records (including the name and number associated with the call, the duration of the call), instant message records, short message records, and email records. Document usage history can include the time and frequency of document access or updates, program usage, contents of the documents, and related files. A meeting schedule associated with a user can be a user's calendar information from a program such as Outlook®, or can be solely based on previous communication events.

The system takes the previous communication events, other communication data, and/or resource usage information and performs an analysis to determine the relations of various data with respect to one another. This analysis allows the system to determine the probability that a given subject, logistic, or resource in connection with a communication event will occur. For example, the system can use the analysis to create ranked lists of the most likely subjects, logistics and/or resources. The system can continue the process of creating lists based on probability indefinitely as the user adds new usage and communication event history information.

In one illustrative example, a user wishes to create a communication event, such as a conference call, between several colleagues. This conference call occurs quarterly with the same group of individuals in order to review updated versions of the same documents at every meeting. Each quarter the conference call occurs at the same time, on the same day of the week. The system analyzes this pattern of behavior and recognizes that when those contacts are involved the subject matter, time, duration, and resources used are usually consistent. When the user creates a new invitation, rather than entering in each unique piece of data required for the invitation, the user only enters a portion of the normal amount of data required, such as an event title. The system then populates some or all of the remaining fields using ranked subject, logistics and/or resources lists. The fields populated by the system can be differentiated in such a way that the user can distinguish between fields populated by the user and fields populated by the system, such as with a different font, color, size, position, shape, or via any other suitable difference. If the populated fields represent the invitation that the user wishes to send, they may complete the invitation. In this example, if the conference call invitation, as populated, looks like the generic quarterly conference call invitation, the user may be satisfied. Otherwise, the user can continue to modify one or more of the fields. When the user modifies the fields, the analysis is again consulted. Based on the fields entered, populated, or selected by the user, the system creates new ranked lists of subjects, logistics, and resources for the current scenario presented. The system can then automatically populate some or all of the non-user filled fields with the ranked data for the new scenario. When the user modifies a field, the system can repeat this process by iteratively updating the suggested fields, narrowing the possibilities that the system will suggest, until the user is satisfied and considers the invitation complete or adequate and approves the invitation.

The user can present rules to the system for creating a communication event. For example, the communication event creator can specify, "Albert and Betty must be in the call. The attendance of Cam, Dan, and Ed is desirable but optional. The conference call must occur before Friday." The system then accesses all or just the relevant portions of the schedules of the individuals involved to determine possible logistics (time, duration) that the parties are available to meet. Upon determining the logistics, the system then populates the remaining logistics, subject, and resource fields, iteratively updating those fields upon further user modification, until the user is satisfied the invitation is complete or adequate.

A user or the system can create a new communication event invitation. As an example, suppose the user calls a friend every Thursday and then immediately creates a communication event, in this case a golf outing scheduled for Friday. After several weeks of this behavior the system can, on Thursday, without user action, commence with the creation of a golf outing appointment scheduled for Friday. The system can present this invitation to the user for confirmation. If the system analyzes phone line information, the system could recognize that usually when the user dials that particular number, a golfing event is scheduled shortly thereafter. The system can then generate the golfing event anytime the friend's phone number is called on a Thursday, or even suggest the back-to-back combination of both events to the user. Similarly, if, after every scheduled meeting in a particular location the user creates a new communication event with attached minutes and reports from the previous meeting, the system can suggest the minutes, reports, and to whom they should be sent.

During a communication event the system can operate in a similar manner. Upon joining the communication event, the system can analyze the subject and logistics of the meeting and create a ranked resources list. The system is then able to suggest the top ranked resources to the user. Such resources include notes, documents, recordings, software programs, Internet searches, files or applications which the user has a high probability of using given the current logistics and communication context of the meeting. As the user ignores, declines, or selects these suggestions, the system can update the communication history and document usage history, thereby updating the analysis and subsequently the ranked subject, logistics, and resources lists.

Similarly, suggestions during the communication event can be based on user actions during the communication event. As mentioned above, a user can ignore, decline, or select a suggestion from the system during a communication event. The type of response gives different feedback to the system, which influences later suggestions accordingly. For example, if the user routinely ignores or declines suggestions to read a report file, the system can either no longer suggest that report file, refine the parameters leading to a suggestion, select an alternate or replacement suggestion, or gradually phase out that suggestion. If all report files are similarly ignored or declined, the system can no longer suggest any report files or take other appropriate action. If, on the other hand, the user routinely accepts suggestions to instant message an associate, the system can continue to suggest such suggestions and can increase their weight or ranking in the list. The suggestions presented by the system during the communication event may be based on specific user action. For example, if a communication event is a conference call, and the system displays the names of all participants, the system can display the particular documents associated with a participant when the user clicks or scrolls over that participant's name. If the user often uses an instant messenger while in communication events, upon clicking or scrolling over a participant's name the system can display a menu option to chat via instant messenger with that participant. If other participants within a communication event are viewing a particular document, the system can display a suggestion to a user to open that particular document.

Figure 2:
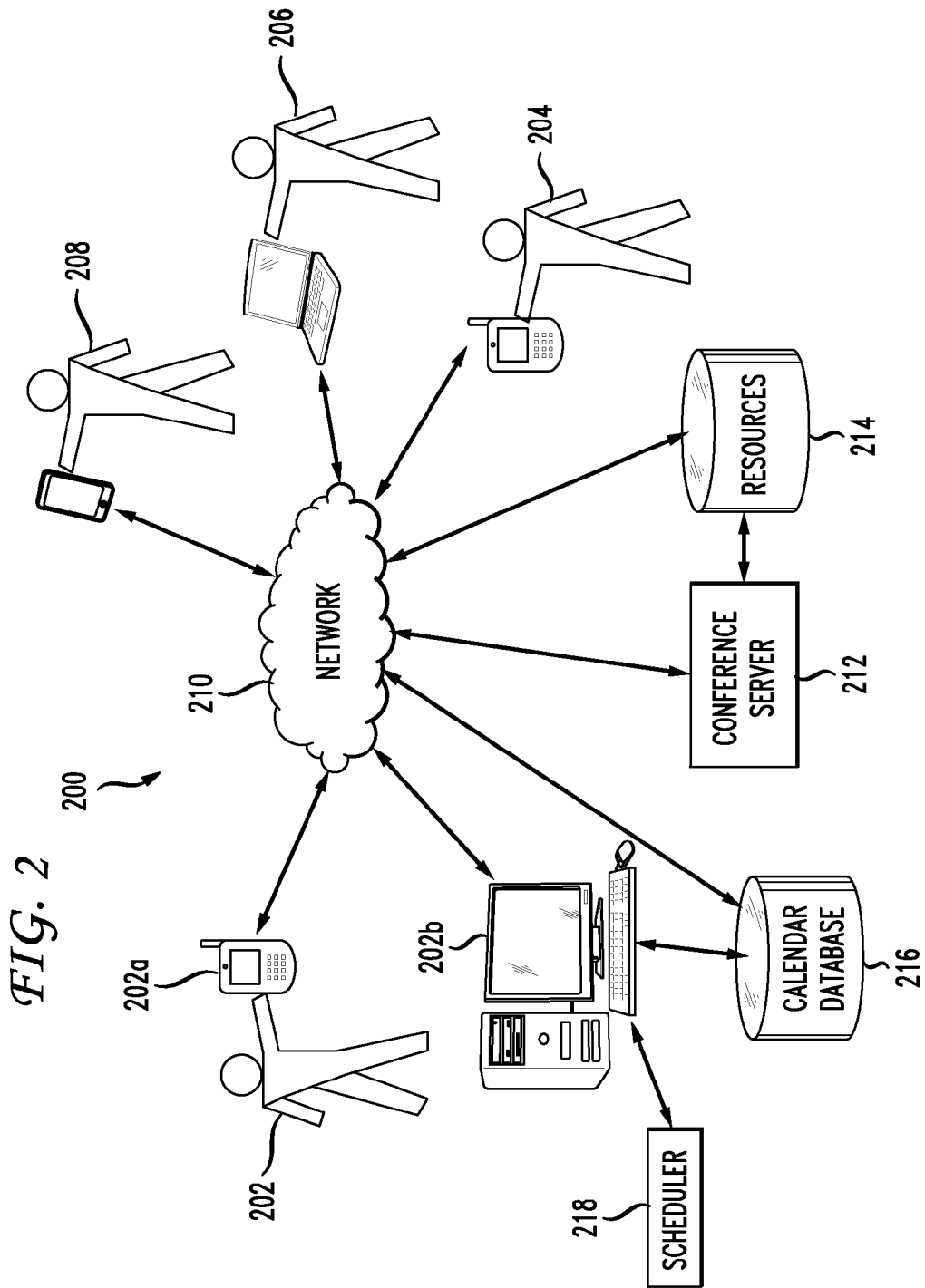
FIG. 2 illustrates an exemplary system infrastructure.

FIG. 2 illustrates an exemplary infrastructure 200 configuration for providing predictive subjects, logistics, and/or resources for a communication event. In this infrastructure 200, a user 202 creates a meeting via a device such as a smartphone 202a or a desktop computer 202b. One or more of the devices extracts data from a user's communication history, a document usage history, and/or a meeting schedule. The communication history, document usage history, and meeting schedule can be stored locally on the device, remotely on a server, or partially stored on other users' devices. Such a device may include just client software for communication event scheduling and it may be a separate server that extracts various data from sources like the conference server, calendar database, email server, and the telephone switch. The system then takes this extracted data and creates an analysis using at least some of the previous subject, resource, and/or logistical possibility. The analysis may be performed within a user's device or a server. One or both of the user's devices 202a, 202b can be used to create the meeting invitation. Upon creating the invitation, the system 202a, 202b can communicate via a network 210 with other software programs, such as a scheduler 218 or a common calendar database 216. The system can further communicate with conference servers 212, resources 214, as well as other invitees 204, 206, 208. These communications can reveal ideal time, conflicts, recently updated documents, frequently accessed documents and other information relating to subject, logistics, and resource information. The system can combine this information with the analysis and apply the information to the user's particular situation and/or context. This evaluation process leads to a ranked list of subjects, logistics, and resources most likely to be used in the invitation. Using this information, the system can populate the invitation fields with the highest ranked subject, logistics, and/or resources. The user 202 reviews this, optionally modifies the invitation, and the system iteratively updates the ranked lists and updates the populated invitation fields, and so on until the user considers the invitation to be acceptable. Once the user 202 is satisfied, the user sends the invitation to other invitees 204, 206, 208. The scheduler 218 can also record the invitation, in the calendar database 216. The conference server 212 and resource database 214 may be similarly updated.

Upon participating in the meeting, the system can send the user 202 resource suggestions, such as via a smartphone 202a or a desktop computer 202b. The resource suggested may belong to the other meeting participants, 204, 206, 208, or may come from additional resources 214.

Figure 3:
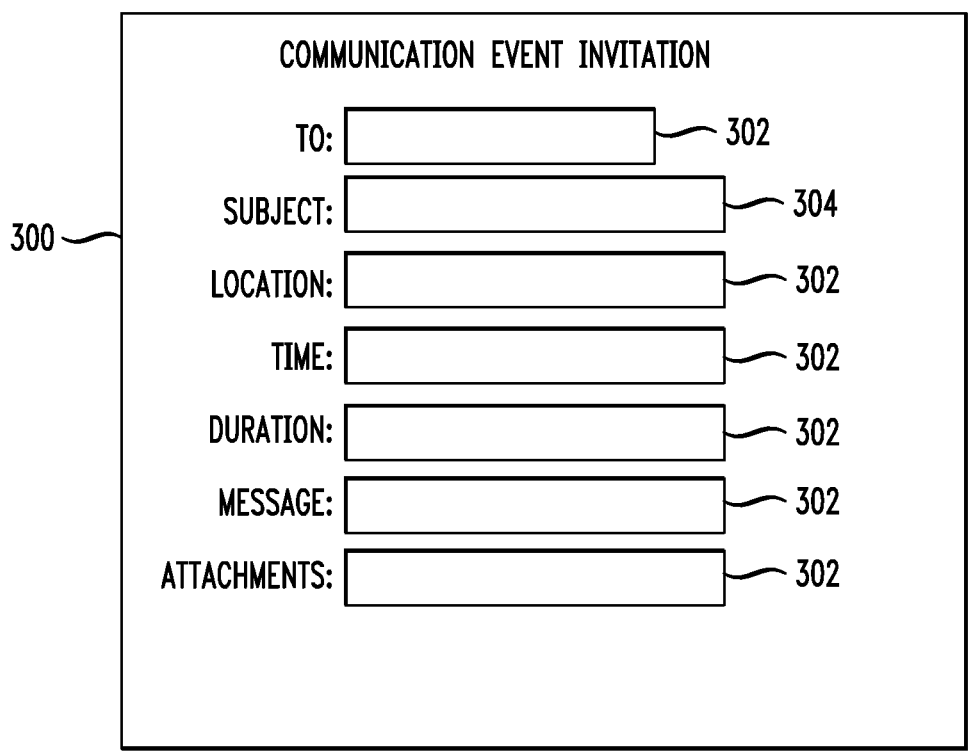
FIG. 3 illustrates a blank exemplary communication event invitation.

The disclosure turns now to a set of examples illustrated by a series of illustrative user interfaces. FIG. 3 illustrates a first example communication event invitation 300. This invitation 300 contains multiple fields, such as the 'subject' field 304 and other logistics fields 302, such as the 'to', 'location', 'time', 'duration', and 'attachments' fields. This invitation is shown blank, but can be automatically populated if the probabilities for creating ranked fields were sufficiently high. Alternatively, other sources can prepopulate some of the fields before the system applies predictions or suggestions to the invitation.

Figure 4:
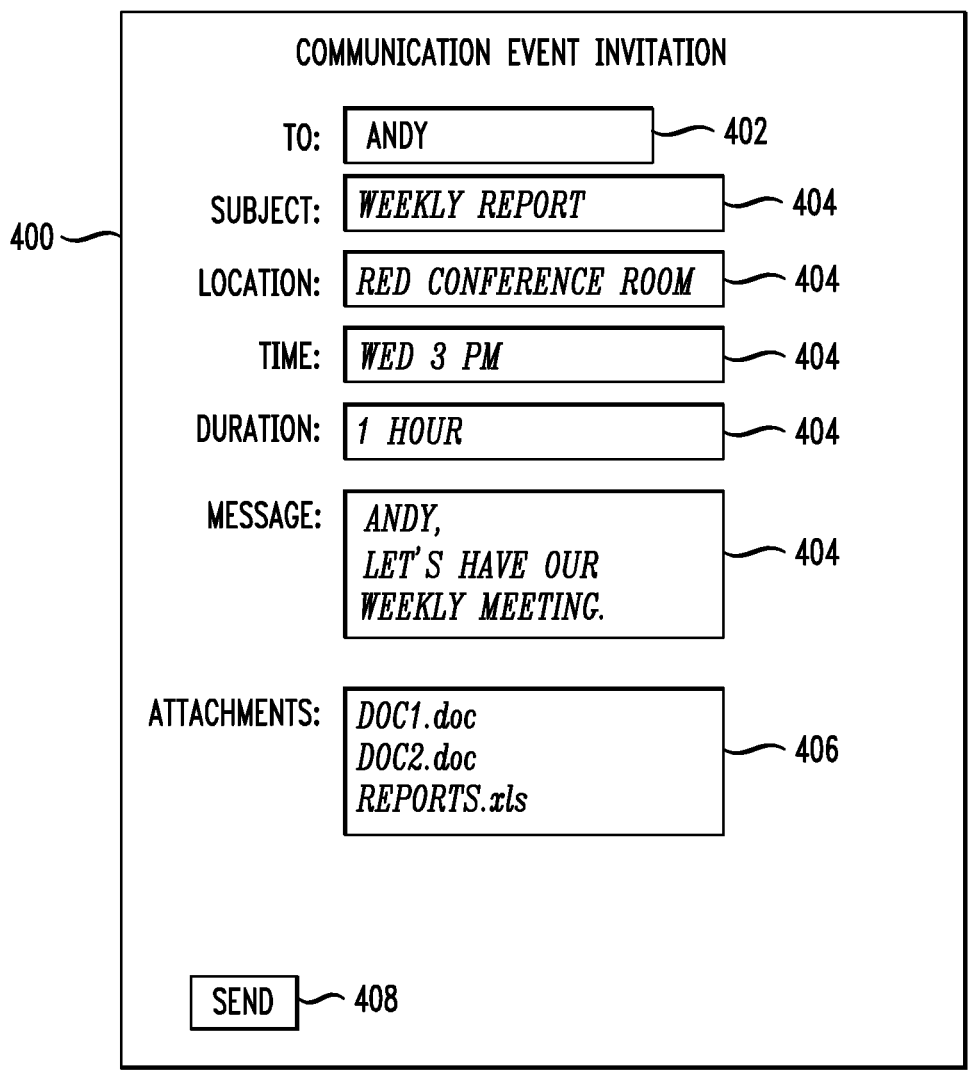
FIG. 4 illustrates an exemplary communication event invitation with populated fields.

FIG. 4 illustrates a second example communication event invitation 400. This invitation 400 has its fields 402, 404, 406 populated. Here the user has filled in the 'to' logistics field 402 with 'Andy.' The system 100 has populated the remaining fields 404, 406. The system can optionally demonstrate the difference between the automatically populated fields 404, 406 by using a distinguishing font, an inverted color scheme, setting the font to bold or underline, or other visual, audible, or other cue to make the user aware of the automatic population of these fields. If the user is satisfied with the invitation, he or she clicks a button 408, or provides any other appropriate user input, to send or otherwise confirm the invitation. Other forms of user input can include voice commands, mouse gestures, touchscreen input, and so forth.

Figure 5:
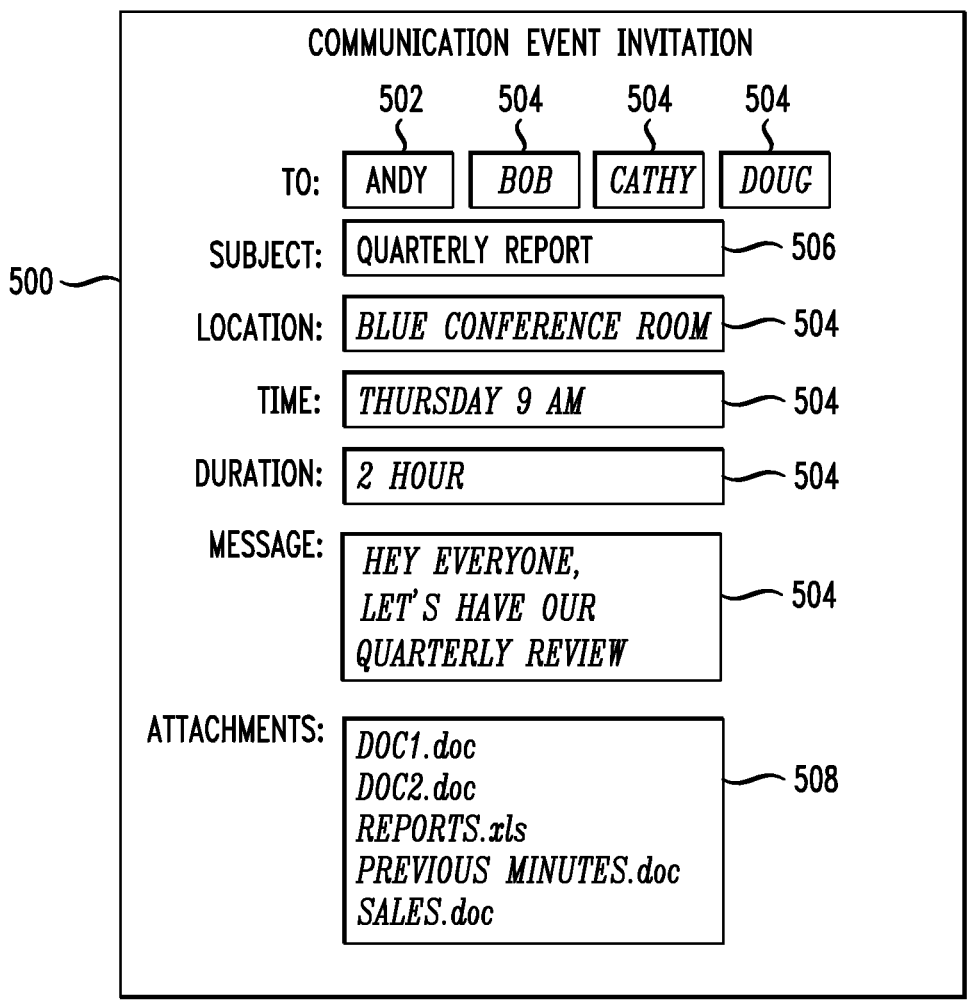
FIG. 5 illustrates an exemplary communication event invitation with populated fields.

FIG. 5 illustrates a third example communication event invitation 500 that is a continuation of the example communication event invitation 400 of FIG. 4. This invitation 500 was not confirmed by the user, but rather was modified by the user. The user modified the 'subject' field 506. At this point in the example, the user has entered two pieces of information into the invitation: 'Andy' in the 'to' logistics field 502, and 'Quarterly Report' in the subject field 506. Upon entering 'Quarterly Report', the system 100 consulted the analysis previously generated, created a new ranked list based on having 'Andy' in the 'to:' field and 'Quarterly Report' in the subject field. Based on this new list, new logistics 504 and new resources 508 have appeared in their respective fields. Because this is a quarterly report, the system 100 recognizes that Bob, Cathy, and Doug normally attend the meeting, that the length of the meeting is longer, that its location is in the Blue rather than the Red conference room, that the date had to change, and that additional documents 508 are normally associated with quarterly report meetings. If the user is satisfied with the invitation, the user clicks the button 408 to send or otherwise confirm the invitation.

Figure 6:
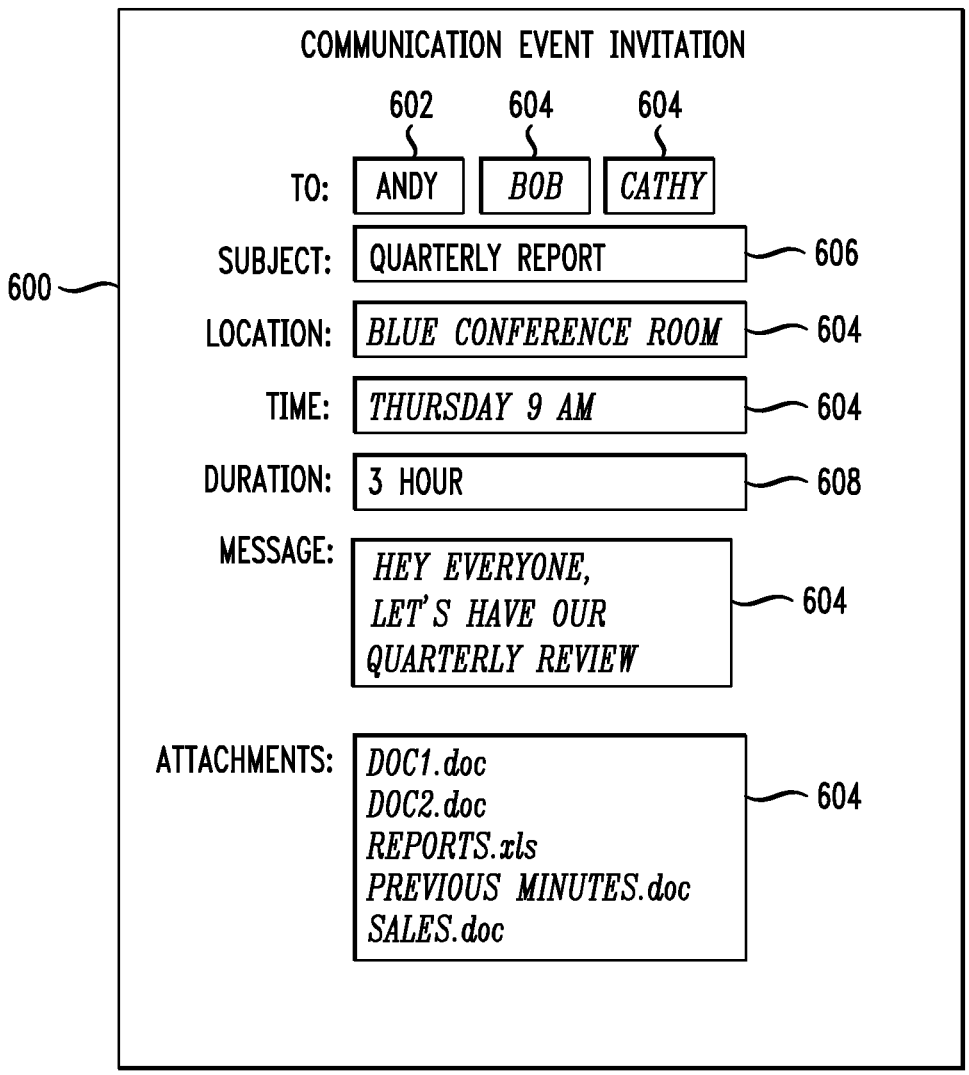
FIG. 6 illustrates an exemplary communication event invitation with populated fields.

FIG. 6 illustrates a fourth example communication event invitation 600 that is a continuation of the example communication event invitation 500 of FIG. 5. This invitation 600 was not confirmed by the user, but was again modified by the user. The user modified the 'duration' field 608. Fields previously entered by the user 602, 606 continue unmodified by the system 100. Upon modifying the duration of the meeting, the system can check the analysis and develop new rankings for the subject, logistics and/or resources to suggest. The system can perform these steps iteratively, such as after every time the user modifies the invitation. The system also checks the calendar database 216 and the schedules of the other users. In this case, the system detects a conflict. Doug from FIG. 5 can no longer attend, or cannot attend the entire meeting, if the meeting duration 608 is 3 hours. If the user is satisfied with this outcome, the user can click a button 440 to send or otherwise confirm the invitation. If not, the user can continue to modify the invitation and the system 100 continues to update the populated fields 604 iteratively based on the modifications. In this manner the range of possible suggestions in the beginning can be quite large. The system can progressively narrow and/or expand the set of possibilities based on user input. Depending on the particularities of the invitation, the communication history, and other factors, that the system may make no suggestions.

FIG. 7 illustrates a fifth example communication event invitation 700. In this instance, the communication event has been created and has blank fields 702, for subject, logistics and resources. The system 100 has sufficient data to create ranked subject, logistics, and resources list. However, rather than populating the fields, the system displays the top ranked suggestions 704 next to their associated field 702. The system can display the top ranked suggestions 704 in order of probability and/or sorted based on any other attribute or weight. Here, for example, the user has a higher probability of inviting Bob than Cathy, though the system considers both to be likely possibilities based on the user's current context.

FIG. 8 illustrates a sixth example communication event invitation that is a continuation of the example communication event invitation 700 of FIG. 7. Here the user has already populated the 'to' logistic field 802. In response, the system 100 has created new subject, logistics, and resource ranked lists. These new rankings have left some suggestions unchanged 808, while changing the suggestions 804 or changing the order of the top ranked suggestions 812 from their previous order 704.

Figure 10:
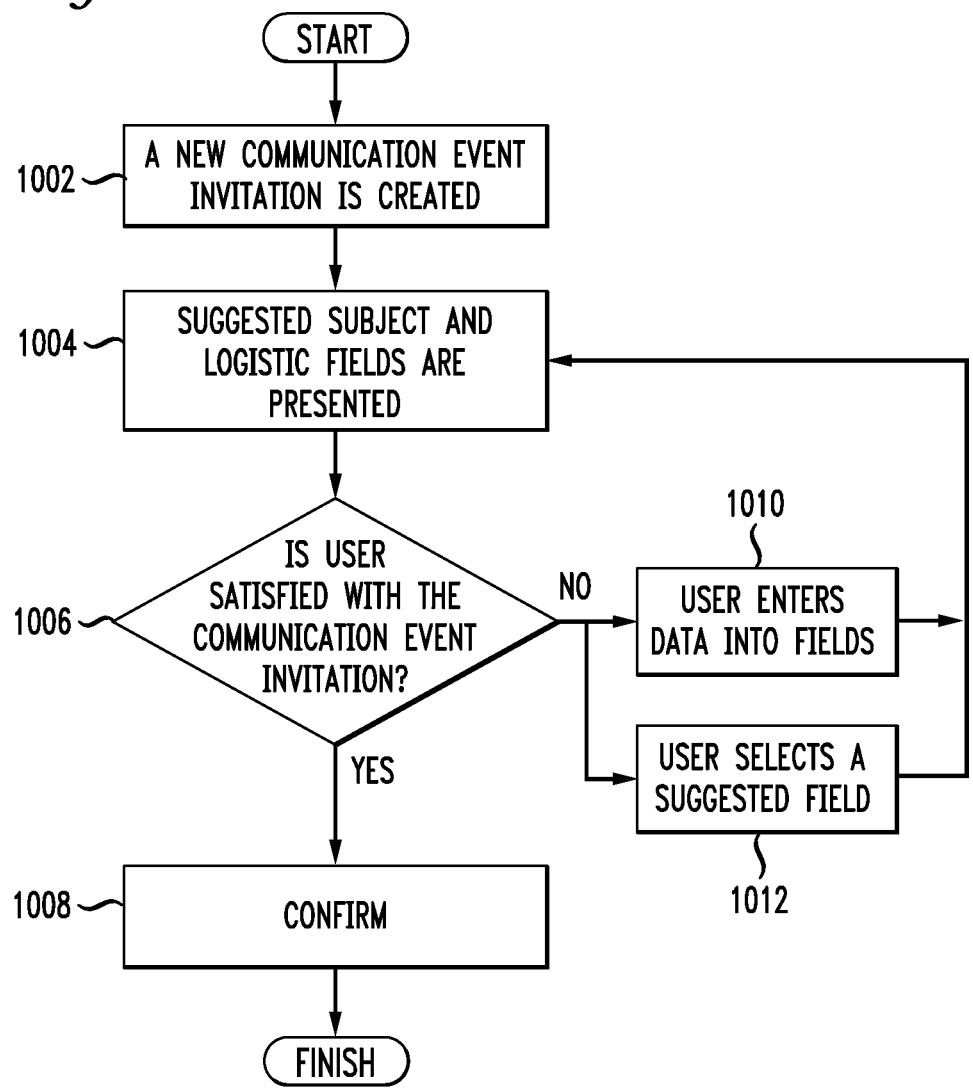
FIG. 10 illustrates a second example method embodiment.
Figure 11:
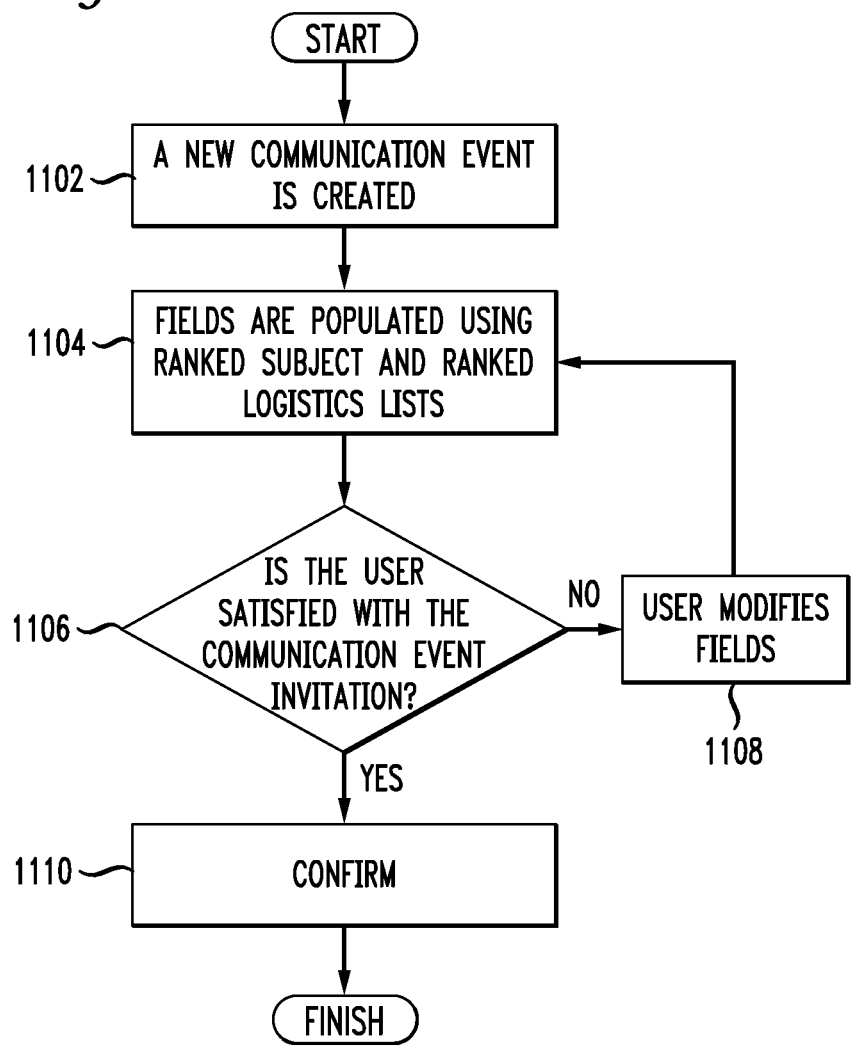
FIG. 11 illustrates a third example method embodiment.

Having disclosed some basic system components and concepts, the disclosure now turns to several exemplary method embodiments shown in FIGS. 9, 10, and 11. For the sake of clarity, each of the methods is discussed in terms of an exemplary system 100 as shown in FIG. 1 configured to practice the methods, and concern the prediction of subjects, logistics, and resources for communication events. The steps outlined herein are exemplary and can be implemented in any combination thereof, including combinations that exclude, add, or modify certain steps.

FIG. 9 illustrates an example method embodiment for predicting the subject, logistics, and/or resources of a communication event invitation. The system 100 creates a new communication event (902). Either the user or the system can initiate creation of the communication event. For example, the system can continuously scan for predicted events and routines. The system then waits for the user to enter information in a field (904), such as a subject field, logistics field, or resource field. The system can wait until the user completely enters information, and/or can detect partially entered information. In the case of partially entered information, the system can then use the partially entered information to begin preparing suggestions for later display when the user has finished entering the information, or can display results as soon as they become available even before the user has finished entering the information. When the user enters information into a field, the system 100 can populate the remaining fields using ranked lists (906). These fields can include, for example, contacts, locations, meeting times, duration, and attachments, though those skilled in the art will appreciate that an event can include other fields. Upon the fields being populated, the user determines if they are satisfied with the communication event invitation (908). If so, the user confirms (912) the invitation. If the user is not satisfied with the communication event invitation, the user can modify one or more of the fields (910). Modification triggers the system 100 to re-form or adjust the ranked subject, logistics, and resources lists based on the newly entered fields, and again populate the fields per the re-formed or re-adjusted ranked lists (906). This cycle continues until the user confirms that the invitation is correct and/or acceptable. Generally the system 100 will be configured not to overwrite the user entered fields, however options to have the system 100 overwrite and/or correct user entered fields are within the scope of this method.

FIG. 10 illustrates a second example method embodiment for predicting the subject, logistics and resources of a communication event invitation. The system 100 creates a new communication event (1002). Either the user or the system can initiate creation of the communication event. The system can then display suggested subject, logistics, and resources to the user (1004). These suggestions do not automatically populate the fields, but are presented for selection by the user. The user can then enter data into the invitation fields (1010) or select one of the suggested fields (1012). The system 100 analyzes field selections and data, creates new ranked subject, logistics, and resource lists, and modifies the displayed suggestions to reflect the new suggestions (1004). When the user is satisfied with the event invitation, they may confirm that satisfaction (1008).

FIG. 11 illustrates a third example method embodiment for predicting the subject, logistics, and resources of a communication event invitation. The system 100 creates a new communication event (1102). Either the user or the system can initiate creation of the communication event. The fields are populated by the system 100 using ranked lists (1103). These fields can be contacts, locations, meeting times, duration, and attachments. An event can include other fields. Upon the fields being populated, the user determines if they are satisfied with the communication event invitation (1104). If so, the user provides a confirmation (1108). If the user is not satisfied with the communication event invitation, the user can modify one or more field (1106). This modification can trigger the system 100 to re-form ranked subject, logistics, and/or resources lists based on the newly entered fields and again populating the fields per the ranked lists (1103). This cycle continues until the user confirms that the invitation is correct. The system 100 may or may not overwrite user entered fields.

Figure 12:
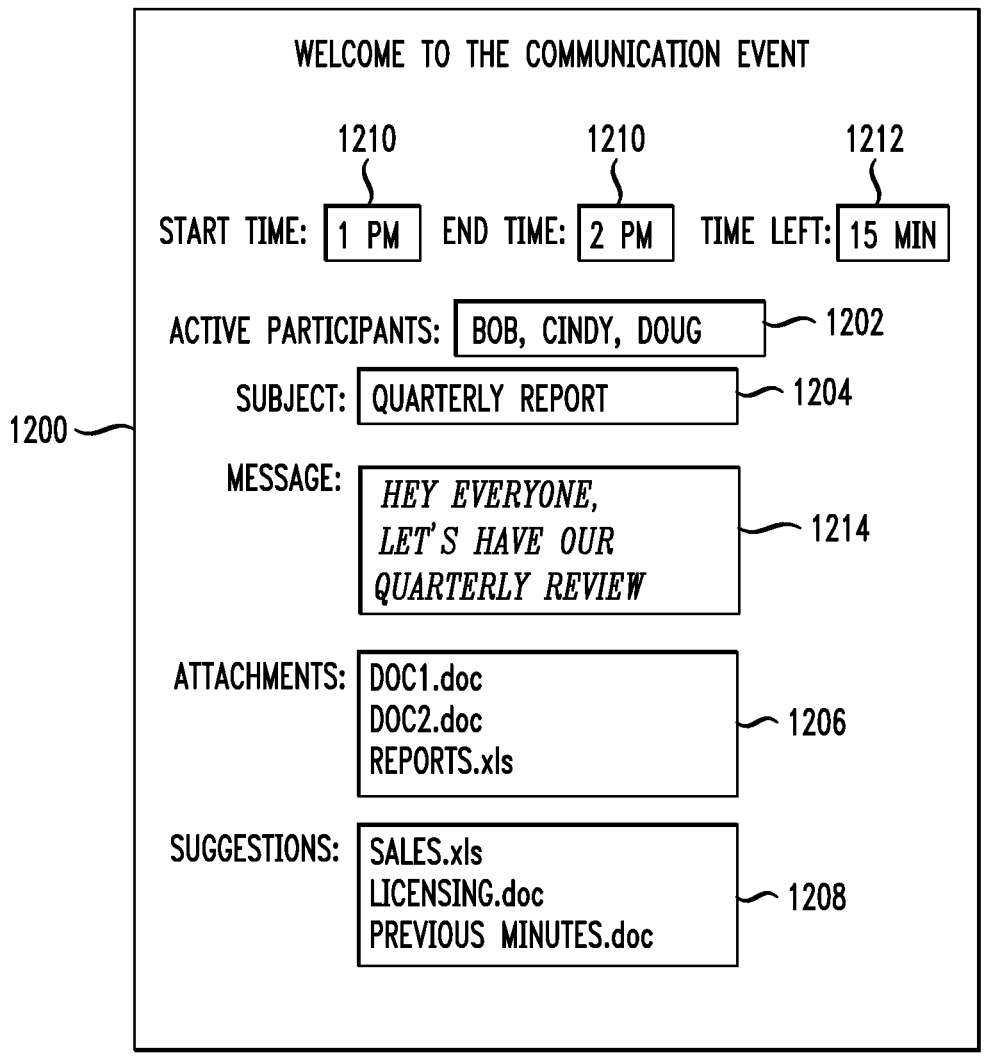
FIG. 12 illustrates a first exemplary user interface embodiment for a communication event.

FIG. 12 illustrates a first example of predicting resources while in a communication event. The communication event window 1200 lists various logistics 1202, such as the active participants and the subject 1204 being discussed. Other logistics, such as the start and end times 1210 are based on the start time and duration sent in the communication event invitation. The time left 1212 compares those times with the current time. The communication event window 1200 also lists the resources that were attached with the communication event invitation 1206, as well as suggested resources 1208. The system can select these suggested resources from the ranked resources list (such as the top N items on the list), based on the current subject and/or logistics of the meeting. These suggestions can be based on user action. For instance, ignoring or declining a suggestion may influence the system such that the system is less likely to make that suggestion, or resources similar to that suggestion, in the future. Accepting or utilizing a suggested resource makes the system more likely to suggest that resource in the future. The suggestions made by the system 1208 are dynamic. If another participant appears, the suggestions may change. If the meeting has multiple topics and the subject 1204 changes, the suggestions may change. If the user ignores all suggestions for a significant amount of time, the suggestions may change. The system can consider multiple factors when preparing and offering suggestions, and if any of those factors change the system can change the suggestions accordingly.

Figure 13:
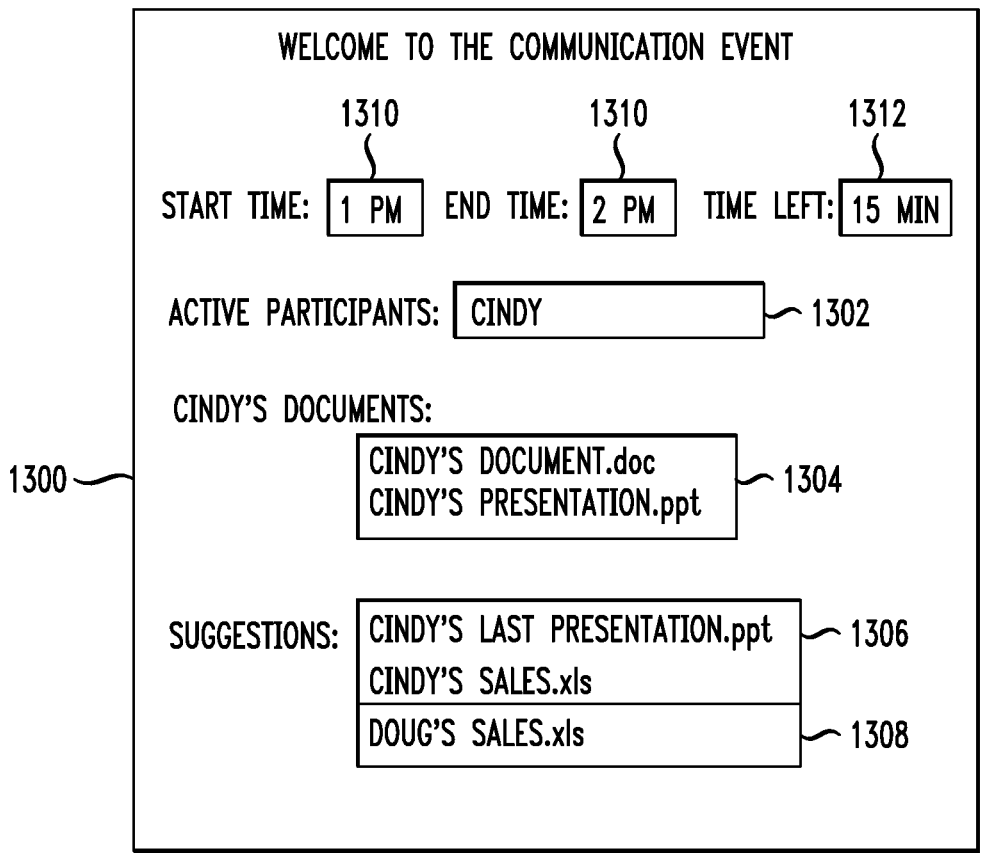
FIG. 13 illustrates a first exemplary user interface embodiment for a communication event.

FIG. 13 illustrates a second example user interface for predicting resources while in a communication event. The communication event window 1300 presents an example of a user selecting the name 1302 of a fellow participant during a meeting. The user can select the name by clicking, touching, rolling over, or otherwise interacting with the name. Upon selecting the fellow participant, the communication event window 1300 presents resources 1304 attached with the communication event invitation by the selected participant 1302. The system 100 can also suggest other documents from the ranked resources list for the user's situation. In FIG. 13, the system suggests the selected participant's previous presentation and sales data 1306. The system also suggests another individual's sales data 1308. Reasons for suggesting a document associated with a non-selected individual could include previous user behavior, similarity of documents, behavior of other participants, or perhaps the speaking order of the participants. The start and end times of the meeting 1310 are still presented, as is the amount of time remaining in the meeting 1312.

Figure 14:
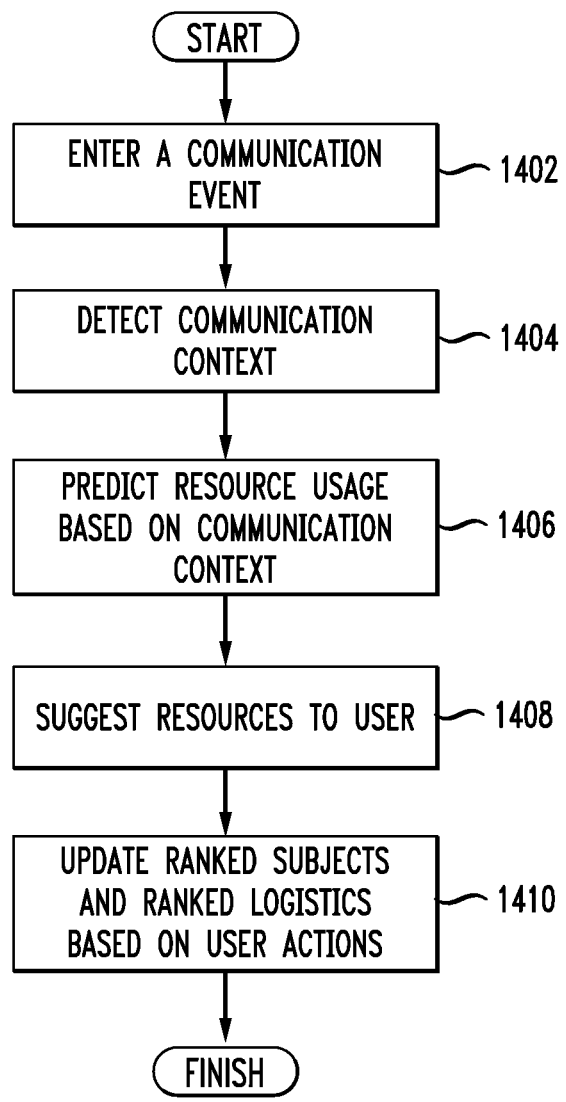
FIG. 14 illustrates a fourth example method embodiment.

FIG. 14 illustrates an example method for predicting resources during a communication event. The system detects that a user enters the communication event (1402), such as a conference call, meeting, or any other type of communication where multiple people are present. The system 100 detects the communication context (1404), meaning it detects the communication event subject and logistics associated with the event. The system 100 then applies the communication event subject and logistics, along with user behavior, to an analysis, yielding a ranked list of likely resources for this communication event (1406). These resources are then suggested to the user (1408), and the system 100 continues to modify the ranked listings (1410), including the ranked subjects, ranked logistics, and ranked resources lists.

Figure 15:
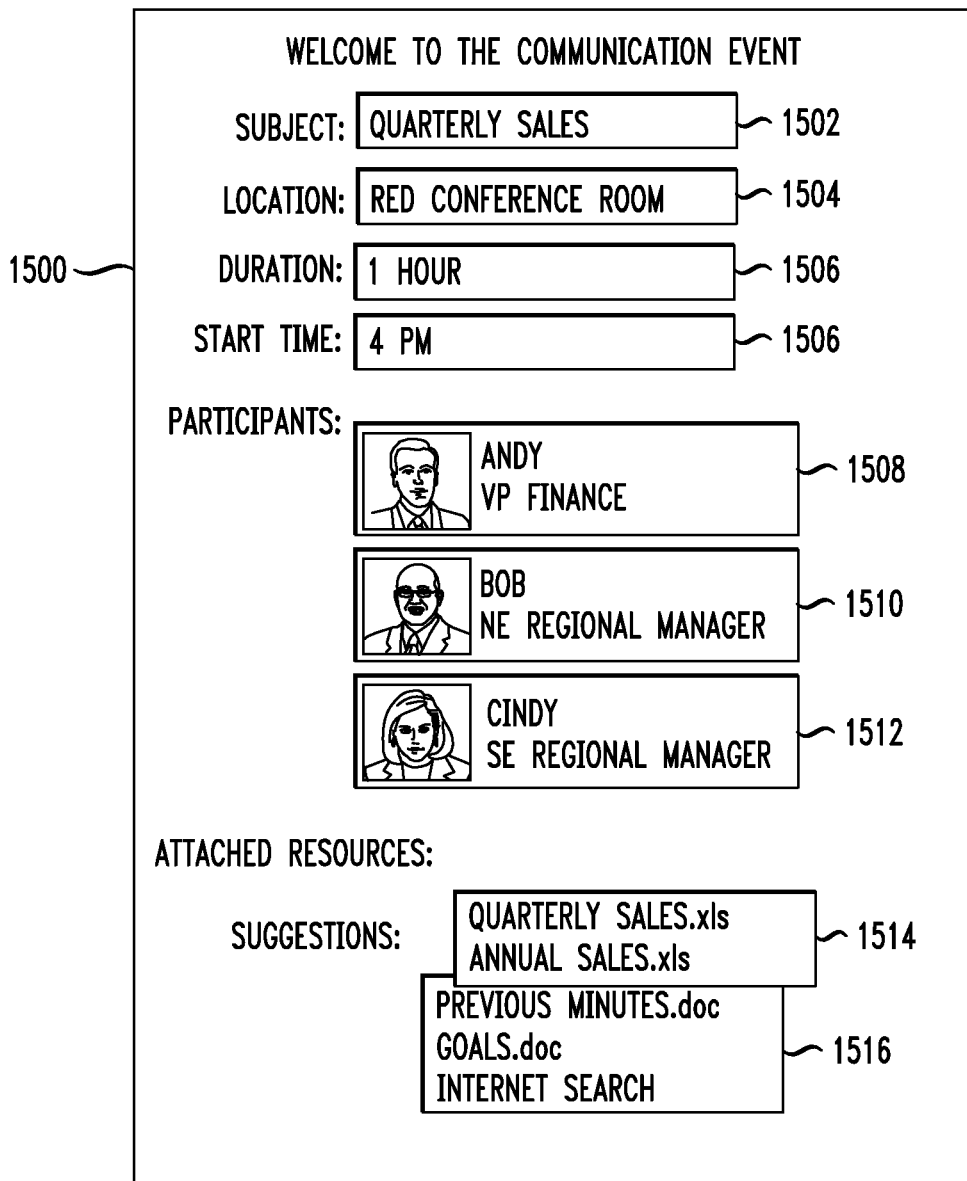
FIG. 15 illustrates a second exemplary user interface embodiment for a communication event.

FIG. 15 illustrates a third example of predicting resources while in a communication event. The communication event window 1500 presents various fixed fields 1502, 1504, 1506 which contain the communication event subject and logistics information. The system 100 uses the communication event subject 1502 and logistics information 1504, 1506 in conjunction with fields related to current participants 1508, 1510, 1512 to determine the current communication context. The fields displaying the current participants 1508, 1510, 1512 can include additional information about the participants, including pictures, titles, names, phone numbers, snippets of a communication history, and/or any other pertinent detail to the current communication context. Attachments included in the communication event invitation are shown 1514, as well as any suggested resources 1516 and/or links to suggested resources by comparing the current communications context to previous user history, analyzing probabilities, and ranking those possibilities into a list of ranked resources.

Figure 16:
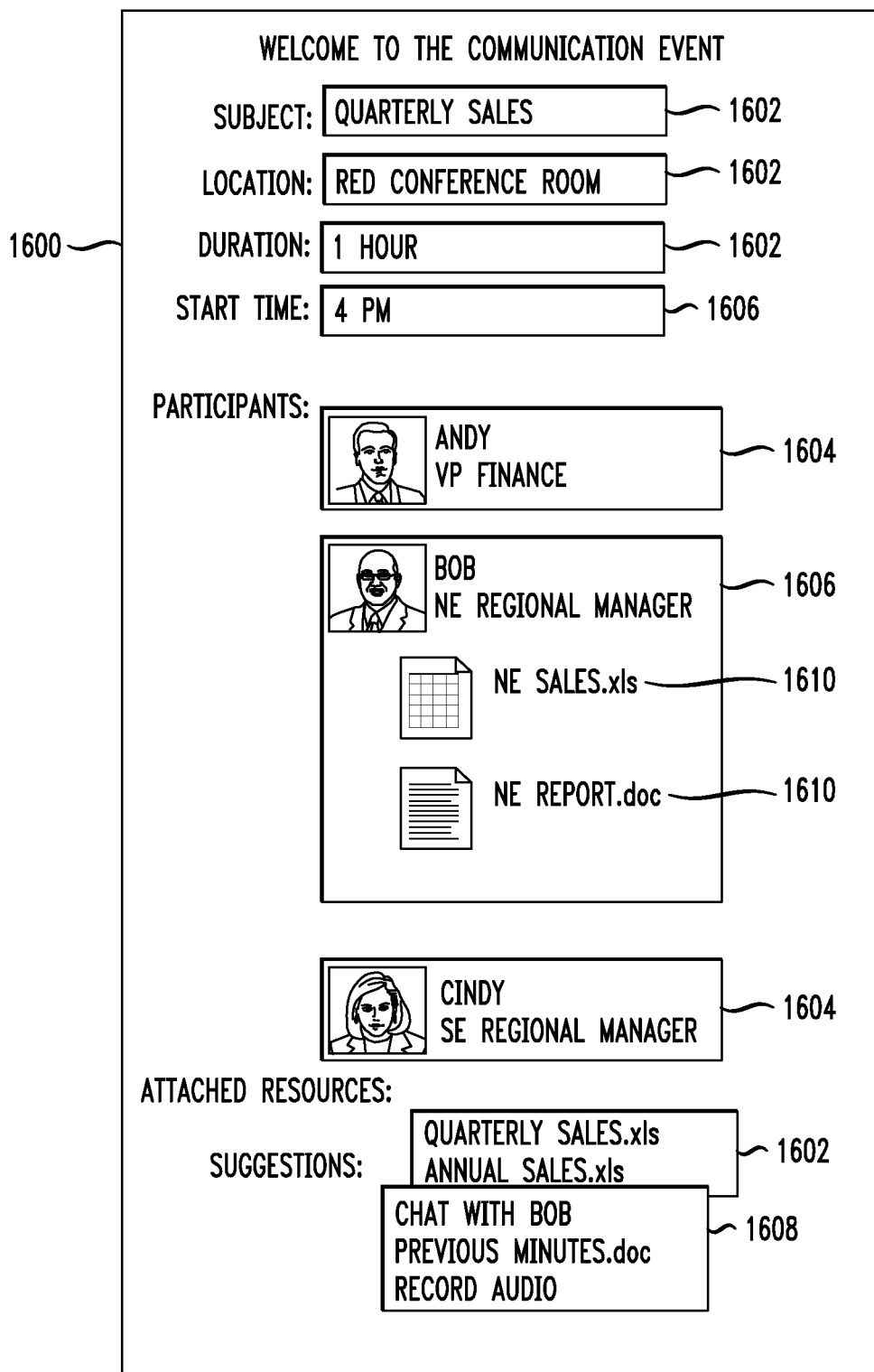
FIG. 16 illustrates a second exemplary user interface embodiment for a communication event.

FIG. 16 illustrates a continuation of the third example of predicting resources while in a communication event. The communication event window 1600 can expand in response to a user action of clicking, touching, rolling over, or otherwise selecting one of the active participants in the communication event 1606. The system 100 displays the documents associated with that participant 1610. Other active participants displayed 1604 retain individual information 1604, and the subject, logistic, and resource information sent in the conference event invitation 1602 remain constant. The suggestions 1608 made by the system 100, however, can change. The system can modify the suggestions in response to user behavior upon looking at a participant's profile 1608.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be implemented as part of a network or on a stand-alone consumer side device. Those skilled in the art will readily recognize various modifications and changes that may be made to the principles described herein without following the example embodiments and applications illustrated and described herein, and without departing from the spirit and scope of the disclosure.

We claim:

1. A method comprising:
analyzing, via a processor, a behavior pattern associated with a user, wherein the behavior pattern represents details of a previous event in which the user participated;
determining parameters comprising a suggested subject, suggested logistics, and a suggested resource that the user is likely to use for a communication event, wherein the parameters are identified based on the behavior pattern associated with the user; and
based on the parameters, automatically creating the communication event for the user by creating a communication event invitation having a subject field, a logistics field, and a resources field, wherein the subject field, the logistics field, and the resources field are populated based on rankings of subjects, logistics, and resources that the user is likely to use for the communication event.

2. The method of claim 1, wherein the subject field, the logistics field, and the resources field are populated based on a rule established by the user.

3. The method of claim 1, wherein the communication event invitation is generated in response to a prior event.

4. The method of claim 1, further comprising receiving input associated with the communication event from the user.

5. The method of claim 4, wherein the input comprises one of accepting the communication event, modifying the communication event, or deleting the communication event.

6. The method of claim 1, wherein the logistics comprise at least one of a contact, an invitee, a location, a time, a duration, or a message.

7. The method of claim 1, wherein the communication event is automatically created in response to a separate communication event.

8. The method of claim 1, wherein analyzing the behavior pattern comprises one of identifying an invitee associated with the previous communication event, identifying a participant associated with the previous communication event, identifying a time associated with the previous communication event, identifying a duration of the previous communication event, identifying an action item associated with the previous communication event, identifying a file associated with the previous communication event, identifying communication event minutes associated with the previous communication event, identifying a recording associated with the previous communication event, and identifying items associated with previous communication events.

9. A system comprising:
a processor; and
a computer-readable medium having stored therein instructions which, when executed by the processor, cause the processor to perform operations comprising:
analyzing a behavior pattern associated with a user, wherein the behavior pattern represents details of a previous event in which the user participated;
determining parameters comprising a suggested subject, suggested logistics, and a suggested resource that the user is likely to use for a communication event, wherein the parameters are identified based on the behavior pattern associated with the user; and
based on the parameters, automatically creating the communication event for the user by creating a communication event invitation having a subject field, a logistics field, and a resources field, wherein the subject field, the logistics field, and the resources field are populated based on rankings of subjects, logistics, and resources that the user is likely to use for the communication event.

10. The system of claim 9, wherein the communication event is automatically created in response to a separate communication event.

11. The system of claim 9, wherein the logistics comprise one of a contact, an invitee, a location, a time, a duration, or a message.

12. A non-transitory computer-readable storage device storing instructions which, when executed by a processor, cause the processor to perform operations comprising:
analyzing a behavior pattern associated with a user, wherein the behavior pattern represents details of a previous event in which the user participated;
determining parameters comprising a suggested subject, suggested logistics, and a suggested resource that the user is likely to use for a communication event, wherein the parameters are identified based on the behavior pattern associated with the user; and
based on the parameters, automatically creating the communication event for the user by creating a communication event invitation having a subject field, a logistics field, and a resources field, wherein the subject field, the logistics field, and the resources field are populated based on rankings of subjects, logistics, and resources that the user is likely to use for the communication event.

13. The non-transitory computer-readable storage device of claim 12, wherein the communication event is automatically created in response to a separate communication event.

14. The non-transitory computer-readable storage device of claim 12, wherein analyzing the behavior pattern comprises one of identifying an invitee associated with the previous communication event, identifying a participant associated with the previous communication event, identifying a time associated with the previous communication event, identifying a duration of the previous communication event, identifying an action item associated with the previous communication event, identifying a file associated with the previous communication event, identifying communication event minutes associated with the previous communication event, identifying a recording associated with the previous communication event, and identifying an item associated with the previous communication event.

* * * * *